United States Patent [19]

Grieshop et al.

[11] 4,024,939
[45] May 24, 1977

[54] WAGON BOX HAVING SIDE AND CENTER DELIVERY FROM ONE OPENING

[75] Inventors: Jerry Grieshop; Maurice Grieshop, both of Fort Recovery, Ohio

[73] Assignee: J & M Manufacturing Co., Inc., Fort Recovery, Ohio

[22] Filed: Feb. 23, 1976

[21] Appl. No.: 660,236

[52] U.S. Cl. .............................. 193/5; 193/31 A; 222/483
[51] Int. Cl.² ........................................ B65G 11/04
[58] Field of Search ............ 193/31 R, 31 A, 5, 17, 193/14; 214/119, 608; 222/533, 484, 483, 531

[56] References Cited
UNITED STATES PATENTS

| | | | |
|---|---|---|---|
| 511,332 | 12/1893 | Harris | 193/5 |
| 1,652,250 | 12/1927 | Morrow | 193/31 R |
| 2,573,714 | 11/1951 | Karl | 193/5 |

Primary Examiner—Stanley H. Tollberg
Assistant Examiner—Hadd Lane
Attorney, Agent, or Firm—Jacox & Meckstroth

[57] ABSTRACT

A gravity type box for a farm wagon, in which the box has a single opening and provides either side or center delivery of flowable material from the box. The opening in the box is in a lower portion thereof and is closed by a sliding door. Two chutes are attached to the box adjacent the opening. The chutes are arranged so that grain flowing from the box through the opening is discharged from either one of the chutes. One chute is adapted to discharge flowable material from the box toward a position below the box, and the other chute is adapted to discharge flowable material from the box to a position at the side of the box.

9 Claims, 6 Drawing Figures

WAGON BOX HAVING SIDE AND CENTER DELIVERY FROM ONE OPENING

BACKGROUND OF THE INVENTION

Numerous gravity type farm boxes have been constructed for use with a wagon for containing and for moving grain or fertilizer or the like. It is desirable that the wagon box be capable of discharging grain to a position substantially below the center of the box or to a position to the side of the box. Most wagon boxes are capable of discharge only to a position below the box or only to a position at the side of the box. A wagon box which is capable of discharge to either side of the box or to a position below the box has had an opening in the bottom thereof and another opening at the side thereof, each opening being closed by a sliding door. Of course, such box structure having two openings and two sliding doors is more costly to produce and presents more problems than a box having only one opening and one door.

It is an object of this invention to provide a wagon box which is capable of either side discharge or bottom discharge and in which the box has a single opening for discharge to either position.

It is another object of this invention to provide such a wagon box in which the delivery elements or chutes can be constructed and attached to the box at relatively low costs.

Other objects and advantages of this invention reside in the construction of parts, the combination thereof, the method of manufacture, and the mode of operation, as will become more apparent from the following description.

SUMMARY OF THE INVENTION

The wagon box of this invention comprises a container provided with side wall portions and a bottom portion. A side wall portion has an opening therein, with a door closing the opening. A pair of chutes are adjustably attached to the container adjacent the lower part of the opening. One of the chutes is adjustable to a position to direct material flowing from the container through the opening to a position below the bottom portion of the container. The other chute is adjustable to a position to direct material flowing from the container through the opening to a position at the side of the container.

DESCRIPTION OF THE PREFERRED EMBODIMENT

Figure 1:
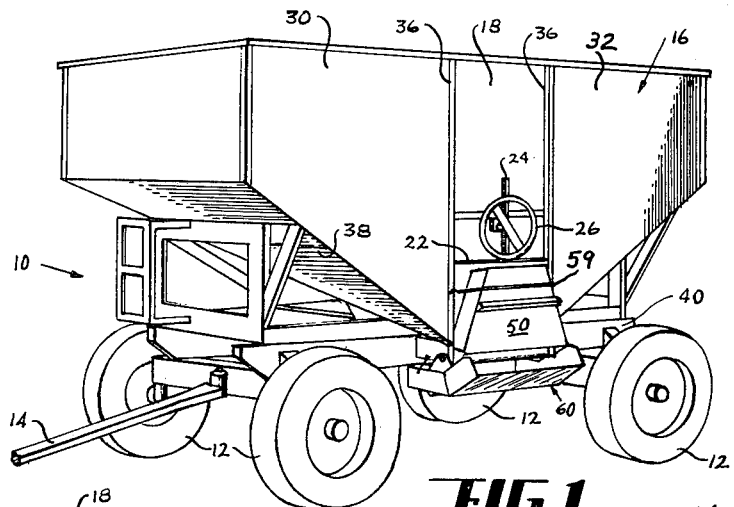
FIG. 1 is a perspective view of a wagon which includes a gravity type box which is provided with delivery elements or chutes of this invention.
Figure 2:
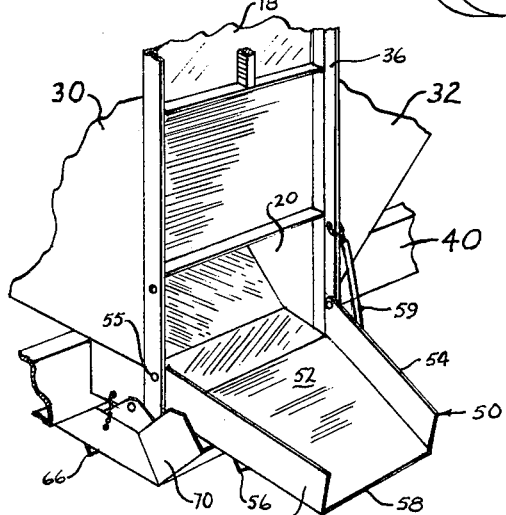
FIG. 2 is a fragmentary perspective view, with parts broken away and shown in section, showing an opening in the side of the box with a closure door in open position, and with a chute arranged to deliver material to a position at the side of the box.
Figure 3:
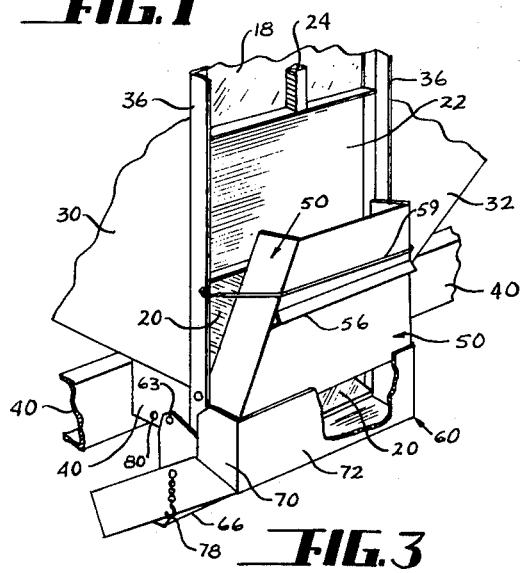
FIG. 3 is a fragmentary perspective view, with parts broken away and shown in section, showing the chutes arranged to deliver the material to a position below the box.

FIG. 1 illustrates a typical gravity type farm wagon 10 which is adapted to be pulled behind a tow vehicle of any suitable type or pulled by a team of farm animals. The wagon 10 is shown as having wheels 12, a tow bar 14, and a box or container 16. As best shown in FIGS. 2 and 3, the box or container 16 has a substantially vertical central side part 18 which has an opening 20 therein.

A door 22 in juxtaposition with the central side part 18 is movable upwardly and downwardly and is movable to a lowermost position to close the opening 20. The door 22 has a vertical toothed rack 24 attached thereto which is in meshed relationship with a gear wheel, not shown, which is attached to a hand wheel 26. The gear wheel and hand wheel 26 are rotably carried by the central part 18. Thus, rotation of the hand wheel 26 moves the door 22 upwardly or downwardly.

The box or container 16 also has side portions 30 and 32, with the central part 18 therebetween. Vertical struts 36 define the central part 18 and separate the central part 18 from the side portions 30 and 32. Floor portions or bottom portions 38 of the box or container 16 slope toward the opening 20. The box 16 is supported by frame members 40.

Figures 4, 5:
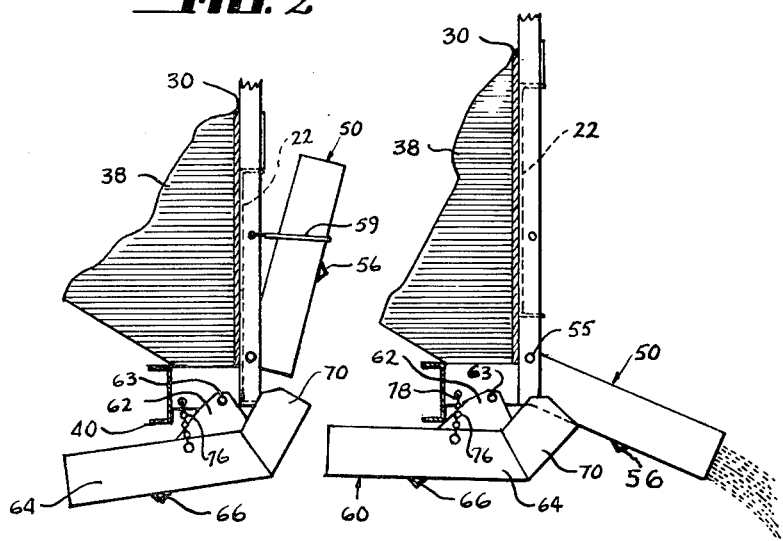
FIG. 4 is a fragmentary side sectional view showing the closure door in closed position to prevent flow of material through the opening and showing the chutes in an inactive position.
FIG. 5 is a fragmentary side sectional view, similar to FIG. 4, but showing the door in an open position to permit flow of material from the box and showing one of the chutes in position to direct material from the box through the opening to a position at the side of the box.
Figure 6:
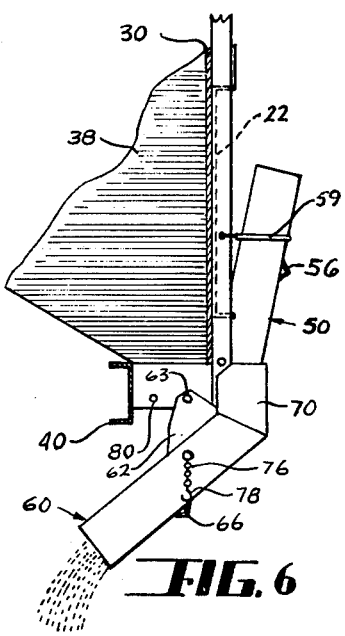
FIG. 6 is a fragmentary sectional view similar to FIGS. 4 and 5, showing the door in an open position to permit flow of material from the box and showing the chutes positioned to direct material flowing from the opening to a position below the box.

A chute 50 is carried by the box 16 and has a floor portion 52 and opposed side portions 54. A brace 56 is attached to the lower surface of the floor portion 52. The side portions 54 are pivotally attached by pins 55 to the struts 36 as the side portions 54 are positioned between the struts 36. The chute 50 has a pivotal position shown in FIGS. 2 and 5 in which the chute 50 extends laterally from the box 16 and is slightly angularly inclined downwardly from the opening 20 to a discharge portion 58 of the chute 50. The chute 50 also has a pivotal position in which the chute 50 is vertically inclined, as illustrated in FIGS. 3, 4, and 6. A strap 59 or the like is attached to the struts 36 and is engaged by the chute 50 to retain the chute 50 in its vertically inclined position, shown in FIGS. 3, 4, and 6.

A chute 60 is also carried by the box 16. The chute 60 has tab portions 62 pivotally attached by pins 63 to a part of the frame members 40, below the box 16. The tab portions 62 are also attached to side members 64 of the chute 60. A brace 66 extends across the lower portion of the chute 60. Attached to the side members 64 and extending angularly upwardly therefrom are opposed side members 70. A wall 72 extends between the side members 70. The side members 70 are adjacent the side portions 54 of the chute 50 and exterior of the chute 50.

Flexible members 76 are attached to the side members 64 and have hooks 78 at the end thereof which are adapted to fit into holes 80 in the frame members 40 to retain a pivotal position of the chute 60 illustrated in FIGS. 2, 4, and 5. When the flexible members 76 are not attached to the frame members 40 the chute 60 is inclined downwardly, as illustrated in FIGS. 3 and 6. The chute 50 is then vertically inclined upwardly. In such positions of the chutes 50 and 60, as shown in FIGS. 3 and 6, when the door 22 is moved upwardly, material within the box 16 flows outwardly from the opening 20 and is directed by the chute 50 into the chute 60. The material thus flows downwardly upon the chute 60 and from the chute 60 to a position below the box 16.

When the chute 60 is in its upper pivotal position shown FIGS. 2, 4, and 5, and retained in such position by the flexible members 76, the chute 50 can be pivotally moved to its downwardly inclined position illustrated in FIGS. 2 and 5. In this position of the chutes 50 and 60, material which flows from the opening 20 moves to the chute 50 and moves downwardly and from the chute 50 to a position laterally spaced from the box 16.

Thus, the chutes 50 and 60 provide means by which material which flows outwardly from the box 16 through the opening 20 can be directed either to a position laterally spaced from the box 16 or to position below the box 16.

Although the preferred embodiment of the farm wagon box or container and delivery elements of this invention have been described, it will be understood that within the purview of this invention various changes may be made in the form, details, proportion and arrangement of parts, the combination thereof, and mode of operation, which generally stated consist in a box or container or delivery elements capable of carrying out the subjects set forth, as disclosed and defined in the appended claims.

The invention having thus been described, the following is claimed:

1. In a box adapted to be a part of a wagon, the box having a side wall portion and a bottom portion, there being an opening in the side wall portion adjacent a lower part thereof, the improvement comprising: a plurality of chutes carried by the box adjacent the opening, there being a first chute and a second chute, the first chute having a connector part attached to the box adjacent the opening and an end part spaced from the connector part, the first chute being movable to a position in which the end part is positioned laterally from the box to receive material flowing from th opening to the first chute and to discharge the material from the first chute to a position laterally spaced from the box, the first chute being movable to a position in which the end portion is at a higher elevation than the connector part, the second chute being attached to the box and having an entrance portion adjacent the opening, the second chute being adapted to receive material flowing from the opening to the entrance portion thereof to discharge material from the second chute to a position below the box.

2. In combination with a gravity type wagon box, the box having an opening therein at a lower portion thereof for movement of material therefrom, a plurality of chutes adjacent the opening, there being a first chute pivotally carried by the box adjacent the opening, the first chute being pivotally movable to a position in which the first chute extends laterally from the box to receive material discharged from the opening to the first chute and to discharge material from the first chute to a position laterally spaced from the box, the first chute being pivotally movable to a vertically inclined position adjacent the opening, there being a second chute pivotally attached to the box adjacent the opening, the second chute having a receiver portion, the second chute being pivotally movable to a position in which the receiver portion is adjacent the opening to receive material which moves from the box through the opening, the second chute having a discharge portion below the box to discharge material to a position below the box.

3. The combination of claim 2 in which the first chute has a portion positionable within a portion of the second chute to direct material flowing from the opening to the second chute.

4. The combination of claim 2 in which the first chute is pivotally movable to a vertically inclined position in which the first chute has a vertically inclined portion within the receiver portion of the second chute to direct material which moves from the opening to the second chute.

5. The combination of claim 2 in which the first chute has a portion extending upwardly from the second chute and positioned adjacent the opening to direct material flowing from the opening to the second chute.

6. In combination with a gravity type wagon box provided with a side wall having an opening therein, the box also having a bottom floor portion, a chute having a receiver portion at the side of the box adjacent the opening and a discharge portion immediately below the bottom floor portion of the box so that material moving from the box through the opening is received by the receiver portion at the side of the box and is discharged from the discharge portion to a position immediately below the bottom floor portion of the box.

7. The combination of claim 6 in which the receiver portion of the chute is vertically inclined at a position laterally spaced from the side wall adjacent the opening and the discharge portion of the chute is inclined downwardly at a position below the box.

8. The combination of claim 6 in which the receiver portion of the chute and the discharge portion thereof are angular, one with respect to the other.

9. In combination with a gravity type wagon box, the box having a bottom floor portion and a side portion, the side portion having an opening therein, a plurality of chutes adjacent the opening, there being a first chute pivotally carried by the box adjacent the opening, the first chute being pivotally movable to a position in which the first chute has a portion below the opening and in which the first chute extends laterally and downwardly from the box to receive material discharged from the opening to the first chute and to discharge material from the first chute to a position laterally spaced from the box, the first chute being pivotally movable to a vertically inclined position adjacent the opening, there being a second chute attached to the box adjacent the opening, the second chute having a receiver portion laterally spaced from the box and adjacent the opening and a discharge portion below the bottom floor portion of the box for discharging material from the discharge portion of the second chute to a position below the bottom floor portion of the box.

* * * * *

UNITED STATES PATENT AND TRADEMARK OFFICE
CERTIFICATE OF CORRECTION

PATENT NO. : 4,024,939
DATED : May 24, 1977
INVENTOR(S) : Jerry Grieshop and Maurice Grieshop It is certified that error appears in the above-identified patent and that said Letters Patent are hereby corrected as shown below:

Column 1, line 63, before "material" omit "the".

Column 3, line 24, after "to" insert ---a---.

Column 3, line 34, change "subjects" to ---objects---.

Column 3, line 48, change "th" to ---the---.

Signed and Sealed this second Day of August 1977

[SEAL]

Attest:

RUTH C. MASON
Attesting Officer

C. MARSHALL DANN
Commissioner of Patents and Trademarks